Jan. 27, 1959     E. G. MUELLER     2,870,873
TREAD BRAKE UNIT FOR RAILWAY VEHICLES
Filed May 31, 1956     4 Sheets-Sheet 4
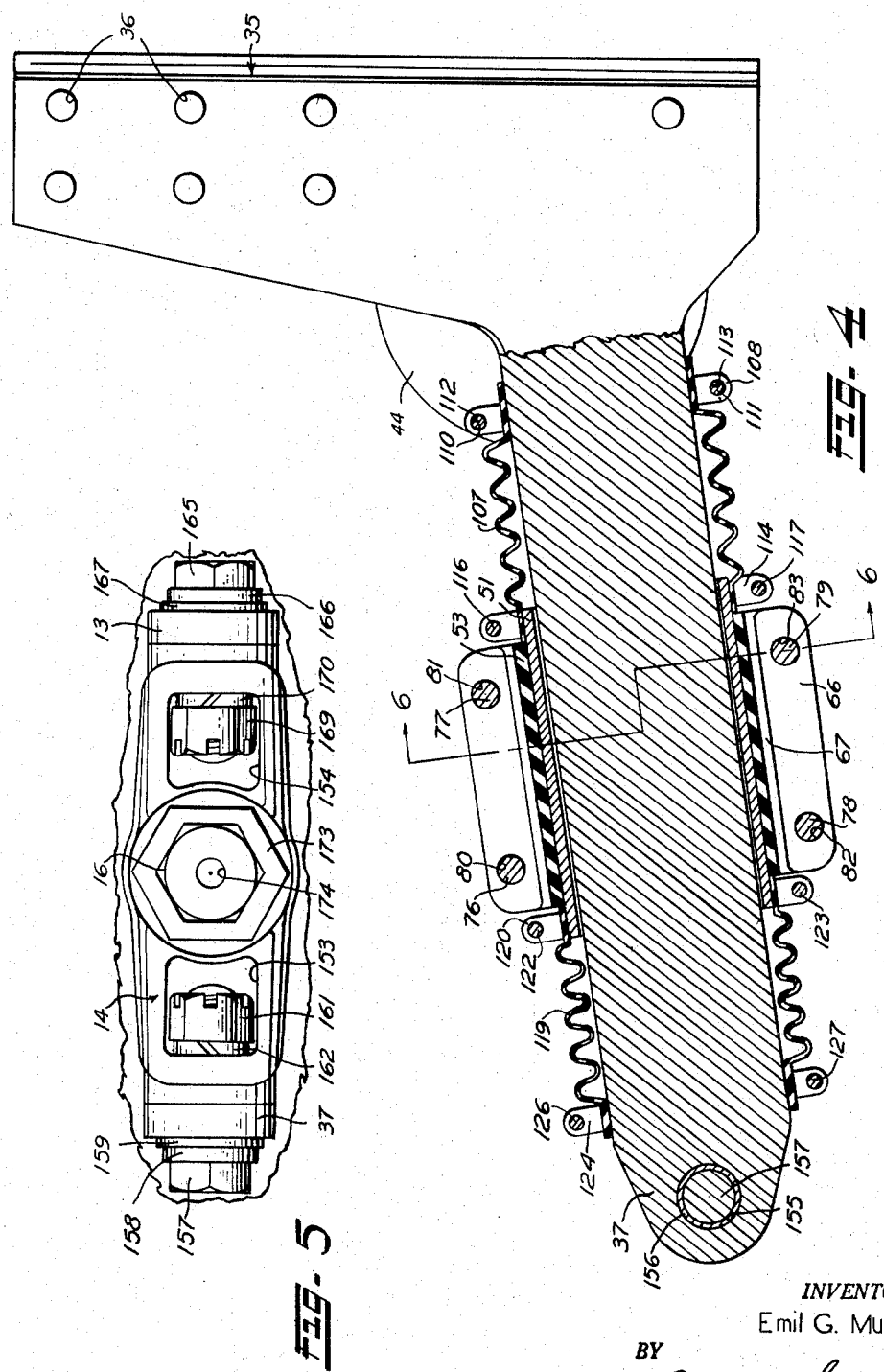
INVENTOR.
Emil G. Mueller
BY
ATTORNEY United States Patent Office 2,870,873
Patented Jan. 27, 1959

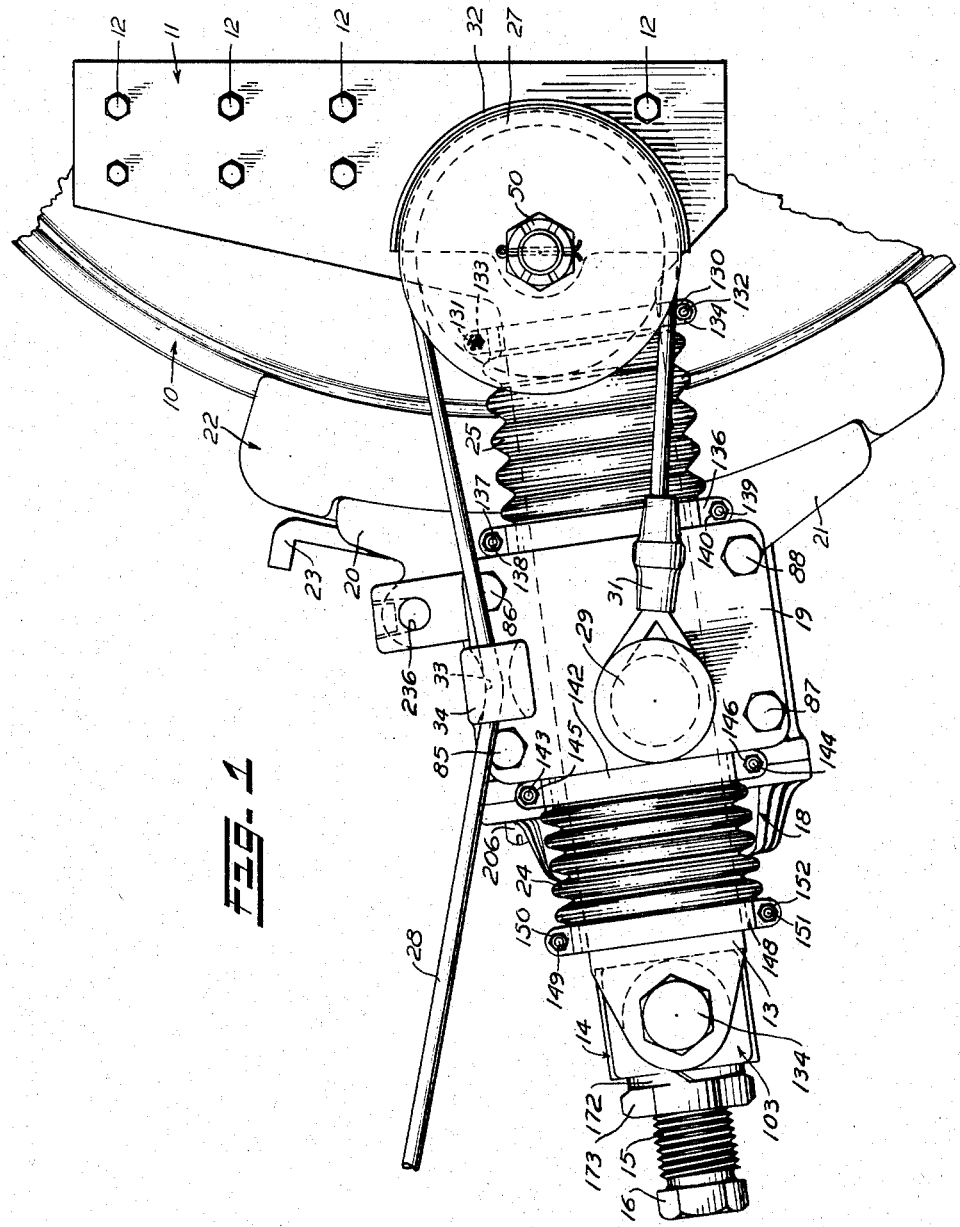

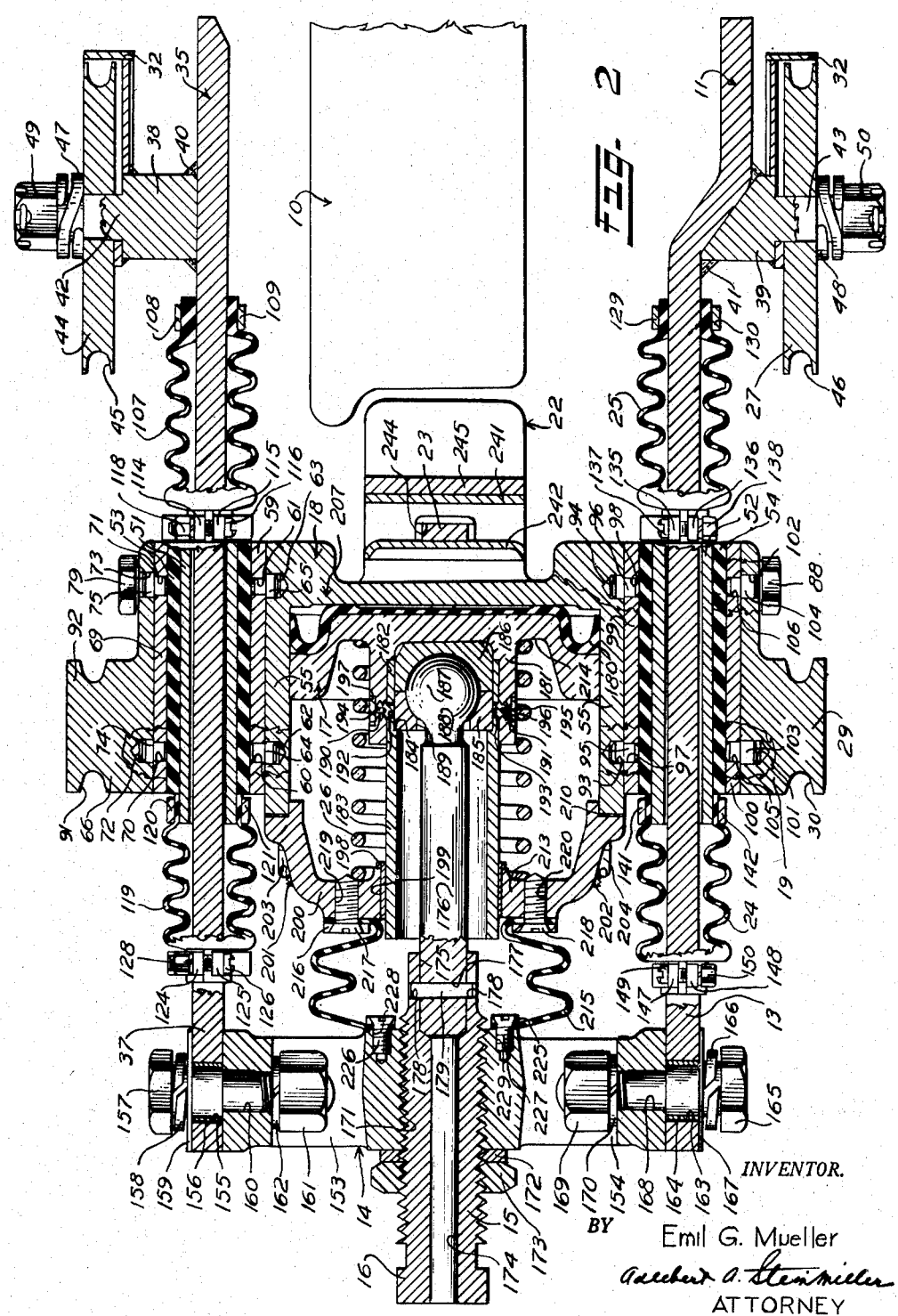

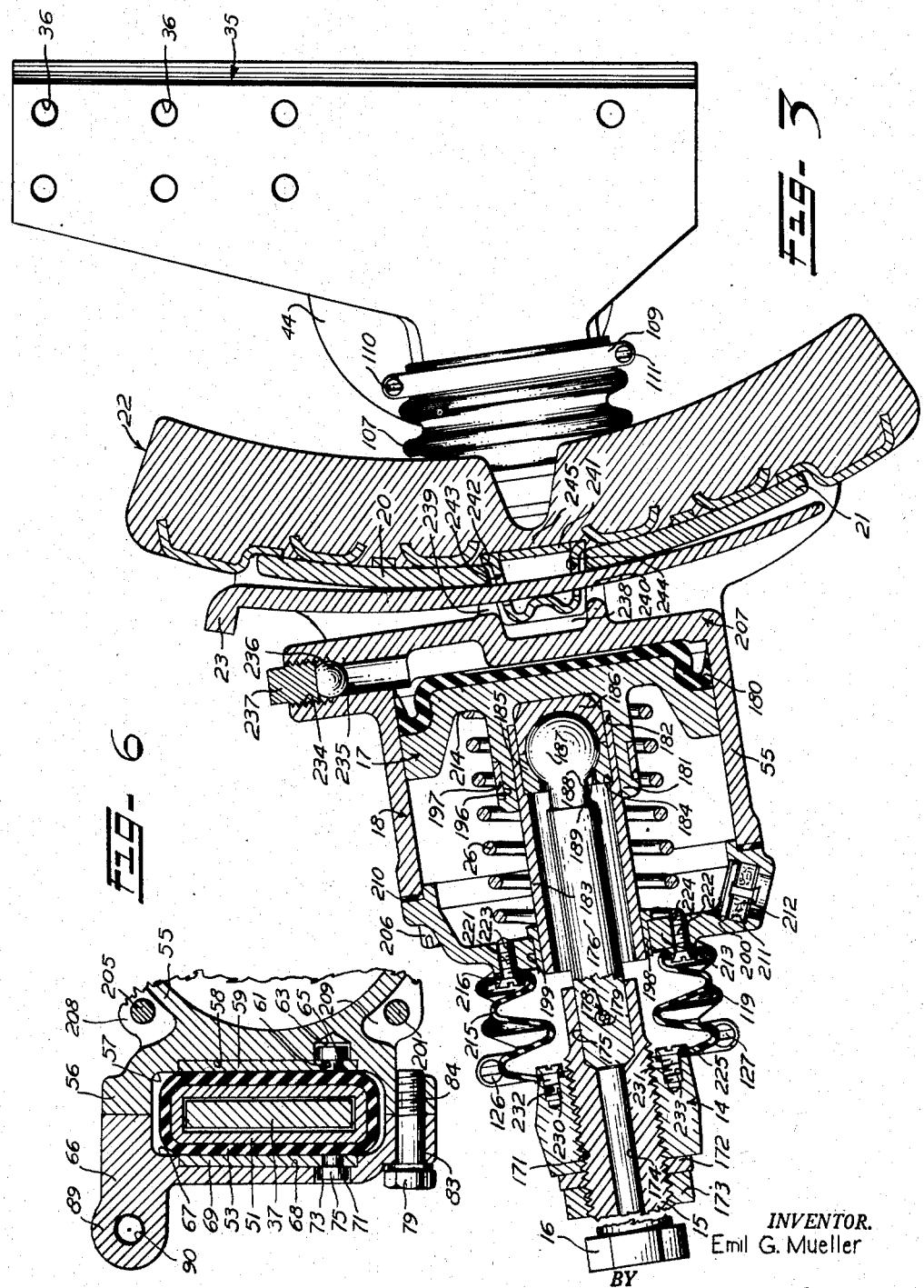

2,870,873

TREAD BRAKE UNIT FOR RAILWAY VEHICLES

Emil G. Mueller, Wilkinsburg, Pa., assignor to Westinghouse Air Brake Company, Wilmerding, Pa., a corporation of Pennsylvania Application May 31, 1956, Serial No. 588,560

9 Claims. (Cl. 188—33)

This invention relates to improvements in tread brake apparatus for wheels of railway cars and more particularly to an improved type of tread brake unit suited particularly for application to the wheels of new lightweight railway cars and eliminating the necessity for elaborate brake levers and rigging.

In conventional types of railway cars, brake apparatus of the clasp type comprises a brake shoe suspended on so-called brake hangers, and which is moved into braking engagement with the tread surface of a car wheel by forces applied through brake levers and rigging from the brake cylinder carried at a point on the car or truck removed from the shoe.

In the new type of lightweight cars equipped with drop center axles, the older conventional type of clasp brake and brake rigging cannot be employed due to limitation of space and weight requirements.

The present invention is accordingly an entirely new design of tread brake suited expressly to the requirements of the new lightweight cars, eliminating the necessity for the conventional brake rigging and providing tread brake apparatus in the form of a unit assembly carried in straddling relation to a wheel and so arranged that a movable brake cylinder is supported and guided, the piston is fixed, and the brake cylinder moves in response to fluid pressure supplied to the brake cylinder to apply force to the brake shoe to effect braking on the tread surface of the wheel. The brake unit assembly includes readily accessible means for adjusting the position of the piston rod relative to the fixed support therefor to provide for take-up of slack, and also for manual brake operation at the car.

It is accordingly the principal object of the invention to provide a tread brake unit or assembly including a brake cylinder for directly applying braking force to the brake shoe without requiring any brake levers or other rigging.

A further object is to provide a tread brake unit of the type indicated in the foregoing object and characterized further in that the piston in the brake cylinder is fixed and the cylinder itself moves to apply the brake shoe to the tread of the wheel.

Another object is to provide new and improved tread brake apparatus of the type referred to in the foregoing objects and having means for adjusting the slack thereof.

A further object is to provide new and improved tread brake apparatus of the type referred to in the foregoing objects and having means for snubbing shocks reaching the brake apparatus.

Still a further object is to provide new and improved tread brake apparatus of the type referred to in the foregoing objects which may be manually operated to provide a parking brake for a railway car.

Other objects will become apparent after a perusal of the following specification which will provide a more detailed understanding of the invention when studied in connection with the accompanying drawings, wherein:

Fig. 1 is a side elevation view of apparatus constructed in accordance with the preferred embodiment of the invention;

Fig. 2 is a cross-sectional view to a different scale through the preferred embodiment of the apparatus in a first plane;

Fig. 3 is a cross-sectional view of another plane substantially perpendicular to the plane of the apparatus of Fig. 2, the car wheel being omitted for clarity;

Fig. 4 is a cross-sectional view through one of the supporting arms upon which the brake cylinder slides, taken in a plane parallel to the plane of the apparatus of Fig. 3;

Fig. 5 is a detailed view of the means by which the piston rod and a supporting cross-member or trunnion member are pivotally attached to the arms upon which the brake cylinder is supported, which arms are fixedly secured to the frame or axle of the car; and Fig. 6 is a cross-sectional view not to scale through an arm, sleeves and a portion of the brake cylinder, taken in a slanting plane along the line 6—6 of Fig. 4.

Particular reference should be made now to the drawings in which like reference characters are used throughout to designate like parts, and in particular to Fig. 1 thereof, in which the general arrangement of the major portions of the apparatus is shown. A portion of the wheel to be braked is generally designated 10. A supporting member generally designated 11 is secured to the frame or axle of the vehicle by a plurality of bolts 12 which pass through bores in the member 11. Member 11 has an extended arm portion 13, upon the end of which is pivotally mounted a trunnion member generally designated 14. The trunnion member 14 has centrally disposed thereof a threaded bore (not shown in Fig. 1) in which is located the threaded end 15 of the outer portion 16 of a piston rod, the inner portion of the piston rod (not shown in Fig. 1) having operatively connected to the end thereof a piston generally designated 17, Fig. 2, the piston 17 being disposed within a brake cylinder generally designated 18, the cylinder being slidably mounted on arm 13 by means including supporting member 19, hereinafter to be more fully described. The brake cylinder has formed integrally therewith upper and lower facing plate portions 20 and 21, upon which a brake shoe generally designated 22 is mounted and held in place thereon by key 23. A pair of accordion type mud guards 24 and 25 are mounted on the arm 13 for preventing dust and other extraneous matter from accumulating thereon, while permitting free movement of the brake cylinder 18. Upon admission of fluid under pressure to the brake cylinder 18, it moves with respect to the piston 17, carrying the brake shoe 22 into braking engagement with the tread of wheel 10. It is to be understood that a second arm similar to arm 13, with a second member similar to member 19 mounted thereon, are located on the other side (Fig. 1) of brake cylinder 18, these being shown in Fig. 2.

Spring biasing means, not shown in Fig. 1 but shown at 26 in Fig. 2, is located inside the brake cylinder 18, and returns the cylinder 18 and brake shoe 22 to a "brake released" position when fluid under pressure is exhausted from the cylinder 18, in a manner hereinafter to be made more clearly apparent.

As hereinbefore stated, one of the objects of the invention is to provide brake apparatus suitable for use as a manually operated parking brake. To this end, a pulley or sheave 27, Fig. 1, is rotatably mounted on the outside of supporting member 11. A cable 28 is attached to member 19 by passing it around connector 29 in the groove 30 thereof, Fig. 2, and clamping the end by clamp 31, Fig. 1. Thence the cable passes around pulley 27, which may have shield member 32 associated therewith, and through the aperture 33 in a protruding cable guide 34 which is formed on the outside of member 19 and may be integral therewith. It should be understood that the lefthand end of the cable 28, Fig. 1, extends and is connected to a lever, not shown, which may be manually operated. Pulling the cable end to the left, Fig. 1, draws member 19 and the attached brake cylinder 18 and brake shoe 22 to the right, until braking contact is made between shoe 22 and wheel 10.

The movable parts of the brake apparatus are more fully shown in Fig. 2, to which particular reference is now made, and in which are shown both of the side frame elements generally designated 35 and 11, element 11 having been already partly described. In Figs. 3 and 4, it will be seen that the side frame element 35 has a large clamping portion in which a plurality of spaced bores 36 are provided for receiving bolts similar to the bolts 12 of Fig. 1, for bolting the member 35 to the cradle or frame structure of the railway car, and the side frame member 35 is seen to have an elongated arm portion 37 for assisting in supporting the movable brake cylinder apparatus in a manner to be hereinafter more fully apparent. The L-shaped side frame members 35 and 11 are so mounted on the axle or vehicle body that the arms 37 and 13 thereof, Fig. 2, extend substantially parallel to each other at a predetermined spaced distance from each other and from the vehicle wheel 10.

The frame members 35 and 11 are seen, Fig. 2, to have mounted thereon a pair of supporting posts 38 and 39 respectively, which are secured to members 35 and 11 in any convenient manner, as by welding at 40 and 41 respectively. The posts 38 and 39 have portions of reduced diameter 42 and 43 respectively upon which are rotatably mounted pulleys or sheaves 44 and 27 respectively, pulley 27 having hereinbefore been identified in Fig. 1, the pulleys 44 and 27 having annular grooves 45 and 46 therein respectively, the pulleys being maintained in position by spring washer members 47 and 48 respectively and nuts 49 and 50 respectively which are in threaded engagement with the threaded ends, not shown, of the portions of reduced diameter 42 and 43 respectively.

The aforementioned arms 37 and 13 have slidably mounted thereon a pair of metallic sleeves 51 and 52 respectively, Fig. 2. Substantially enclosing these metallic sleeves and movable therewith are a pair of rubber sleeves, or sleeves composed of other suitable resilient material, 53 and 54 respectively, the resilient sleeves being provided to snub shocks to the aforementioned brake cylinder 18, in a manner hereinafter to be more clearly apparent. The ends of the metallic sleeves extend beyond the ends of the rubber sleeves, to provide for attaching mud guards, in a manner hereinafter to be made more clearly apparent.

The brake cylinder 18, having the cylindrical wall portion thereof designated by the reference numeral 55, is slidably mounted upon the arm portions 37 and 13, as aforementioned, the metallic sleeves 51 and 52 and the rubber sleeves 53 and 54 sliding with the brake cylinder. The brake cylinder wall 55 has along both sides thereof elongated flaring portions, one of these for the upper side of the brake cylinder as seen in Fig. 2 being shown in Fig. 6 and designated 56, a similar elongated flaring portion being provided on the other side of the brake cylinder adjacent arm 13. Elongated portion 56 has an elongated groove 57 therein, Fig. 6, in which there is a smaller elongated groove 58 in which is disposed metallic plate 59. Metallic plate 59 has therein a pair of bores 60 and 61, Fig. 2, which are in substantial alignment with a pair of somewhat larger bores 62 and 63 respectively in the elongated portion 56. A pair of locking pins 64 and 65 pass through the bores 60 and 61, respectively, holding the plate 59 in position in the slot or groove 58. Pins 64 and 65, and other similar pins to be hereinafter described, preferably have their heads fitting snugly in the respective bores, although for clarity of illustration some space is shown between the head of the pin and the wall of the bore.

Mounted outside of elongated portion 56 is an elongated supporting member generally designated 66, Figs. 2 and 6. The member 66 is similar to member 19 shown in Fig. 1. Member 66 has an elognated groove 67 therein, Fig. 6, which has a smaller elongated groove 68 therein. Disposed in the groove 68 is a metallic plate 69 having bores 70 and 71 therein, Fig. 2, in substantial alignment with bores 72 and 73 respectively in the wall of member 66, in which bores are disposed a pair of pins 74 and 75 respectively, for holding plate 69 securely in position in groove 68.

Member 66 is securely held adjacent portion 56 by four bolts designated by the reference numerals 76, 77, 78, and 79, Fig. 4, one of the bolts 79 being also shown in Figs. 2 and 6, the bolts passing through bores 80, 81, 82, and 83 respectively in the member 66, Fig. 4, into threaded bores in the cylinder wall, one threaded bore being shown at 84, Fig. 6. Four corresponding bolts are provided to hold member 19, Fig. 1, to the adjacent extended flaring portion of the brake cylinder, and are designated 85, 86, 87 and 88.

Disposed between member 66 and wall portion 56, Fig. 6, in the space provided by grooves 57 and 67, is the aforementioned arm portion 37, which is enclosed by aforementioned metallic sleeve 51 which is in turn enclosed by aforementioned resilient sleeve 53, sleeve 53 having opposite sides thereof adjacent aforementioned metallic plates 69 and 59 respectively. Preferably sleeve 51, resilient sleeve 53, and plates 69 and 59 are all bonded together, any suitable bonding material and process being employed, so that these all move together with each other as sleeve 51 slides on arm 37.

The aforementioned member 66 has a protruding cable guide portion 89, Fig. 6, with an aperture 90 therein for passage of a cable, not shown, but which is similar to cable 28, Fig. 1, and which, while connected, passes around pulley 44 in the groove 45 thereof and is secured in the groove 91 of connector 92, and is adapted to be operated simultaneously with the cable 28 of Fig. 1, assisting in moving the brake cylinder 18 and the brake shoe 22 carried thereby to positions whereat the shoe 22 makes braking engagement with the wheel 10, providing, as aforementioned, a manually operable parking brake.

On the other (lower) side of the apparatus of Fig. 2 the structure is similar, the bores in the elongated flaring portion of the brake cylinder wall being designated by the reference numerals 93 and 94. Mounted in these bores are a pair of pins 95 and 96 respectively. The ends of the pins 95 and 96 extend through somewhat smaller bores 97 and 98 respectively in a metallic plate designated 99, the plate 99 being disposed between the side portion 55 of the brake cylinder wall and the adjacent side of the aforementioned rubber sleeve 54. Inside the sleeve 54 is the aforementioned metallic sleeve 52 slidable on arm 13. Bolted to the side wall 55 of the cylinder as aforementioned is the member 19, which has a groove therein for receiving metallic plate 100. Member 19 has bores 101 and 102 therein, pins 103 and 104 being located in these bores 101 and 102 respectively while the ends of the pins 103 and 104 extend through bores 105 and 106 respectively in the aforementioned metallic plate 100, holding the plate 100 in position adjacent the outside surface of resilient sleeve 54. Preferably, metallic plates 99 and 100, resilient sleeve 54 and metallic sleeve 52 are all bonded together and are firmly maintained in position with respect to the cylinder 18 as metallic sleeve 52 moves on arm 13.

The aforedescribed sleeve and plate arrangement provides for suspension of the brake cylinder by means of rubber in shear, to effectively dampen normal shocks and vibrations. The small air spaces shown above and below the top and bottom respectively of the rubber sleeve provide room for expansion of the rubber sleeve to absorb shocks of unusual intensity.

Since the brake apparatus of the instant invention must of necessity be mounted underneath the railway car or other vehicle where it will be subject to the accumulation of such extraneous matter as dust and mud, and since it is necessary that the metallic sleeves 51 and 52 slide freely upon the respective arms 37 and 13, four accordion type mud guards, two for each arm, are provided, for permitting free movement of the metallic sleeves while at the same time protecting the sleeves and arms from exposure to mud, moisture, and dust, two of the guards 24 and 25 having previously been briefly described in connection with Fig. 1. Particular reference should be made now to Figs. 2 and 4. The front or right-hand mud guard 107 on arm 37 has its front end, or end nearest the aforementioned post 38, secured to the arm by a pair of clamp members 108 and 109, which are securely clamped to each other by bolts 110 and 111 passing through bores 112 and 113, Fig. 4, thereby securing the end of the mud guard 107 in position on the arm 37. The bolts 110 and 111 have nuts, not shown, associated therewith. The other end of the guard 107 fits snugly around the end of the metallic sleeve 51 and is securely held in place thereon by clamp members 114 and 115, and by bolts 116 and 117 passing through bores in the ends of the clamp members, one of the nuts, in particular that for bolt 116 being shown in Fig. 2 and designated by the reference numeral 118.

On the other side of the metallic sleeve 51 a second accordion-type mud guard 119 is provided, the mud guard 119 being secured to sleeve 51 by a pair of clamp members 120 and 121, Fig. 2, and by bolts 122 and 123, Fig. 4. The other end of the mud guard member 119 is securely fastened to the arm 37 by a pair of clamp members 124 and 125, Fig. 2, having bolts 126 and 127 associated therewith, Fig. 4, the nut 128 for bolt 126 being shown in Fig. 2.

The other arm 13 of Fig. 2 is similarly equipped with a pair of aforementioned mud guards 25 and 24. Mud guard 25 nearest post 39 is secured at one end thereof to the arm 13 by clamp members 129 and 130 which are secured together by bolts 131 and 132, Fig. 1, having nuts 133 and 134 associated therewith respectively, and at the other end thereof mud guard 25 is secured to metallic sleeve 52 by clamp members 135 and 136 which are bolted together, one of the bolts being shown at 137, Fig. 2, and having associated therewith a nut 138, the other bolt being designated 139, Fig. 1, and having nut 140. On the other side of the sleeve 52 one end of an additional accordion-type mud guard 24 is fastened to the sleeve 52 by clamp members 141 and 142, the clamp members 141 and 142 being secured together by bolts 143 and 144 passing through bores therein, bolts 143 and 144 having nuts 145 and 146 respectively, Fig. 1. The other end of the mud guard 24 is secured to arm 13 by clamp members 147 and 148 having bolts associated therewith, one of the bolts being shown at 149, Fig. 2, and having a nut 150 associated therewith, the other of the bolts being shown at 151, Fig. 1, and having nut 152.

As was stated hereinbefore, the brake cylinder of the subject apparatus is adapted to move while the piston and piston rod remain substantially stationary, means being provided to pivotally support the piston rod on the aforementioned pair of arms 37 and 13. This last named means includes an aforementioned end piece or trunnion member generally designated by the reference numeral 14 and having a pair of cut-out portions 153 and 154 on the sides thereof, Fig. 5, for purposes to be hereinafter more fully apparent. The arm 37 has a bore 155 therein, Fig. 4, in which is mounted a bushing 156. Passing through the bushing 156 is the shank portion of a bolt 157 having lock washer 158, Figs. 2 and 5, and spacer washer 159 associated therewith, the shank portion of the bolt 157 passing through a bore 160, Fig. 2, in member 14 and having in threaded engagement thereon the nut 161, lock washer 162 being provided as shown. On the other side of the apparatus, Figs. 2 and 5, the aforementioned arm 13 has therein a bore 163 having mounted therein a bushing 164 through which passes the shank portion of a bolt 165 having washers 166 and 167 associated therewith on the outside end thereof, the shank portion of the bolt 165 passing through a bore 168 in member 14 and having in threaded engagement on the threaded end thereof a nut 169, lock washer 170 being provided as shown, Fig. 2.

The aforementioned cross-piece or trunnion member 14 has centrally disposed therein a large threaded bore 171, Figs. 2 and 3, for receiving the aforementioned threaded portion 15 of the outer portion 16 of the aforementioned piston rod, the threaded relationship of the bore 171 in trunnion 14 and the threaded portion 15 of piston rod 16 being provided so that an adjustment may be made in any slack in the brake apparatus, which adjustment is desirable for reasons well known to those familiar with the braking art. A washer 172 is provided and a locking nut 173 for holding the piston rod in the desired position in the member 14. The piston rod portion 16 has a relatively small bore 174 therein, Figs. 2 and 3, and also has a relatively larger bore 175 therein on the inside end thereof for receiving another piston rod portion 176 in telescoping engagement therein. The rod portion 176 has a diametral bore 177 therein, and the member 16 has bores 178 in the sides thereof for receiving the pin 179 which passes through the portions or members 16 and 176 for holding the members or portions securely together to form the complete piston rod.

As aforementioned, the brake cylinder is adapted to move in the instant invention while the piston and the piston rod are adapted to remain substantially stationary; however, a certain amount of play at the coupling between piston and piston rod must be provided for, and a certain amount of adjustment over a small angle must be allowed for, so that the brake cylinder may align itself properly, in order that the maximum force can be exerted between the brake shoe 22 and the tread of the wheel 10. To provide for this arrangement, a ball and socket joint is provided as shown, Figs. 2 and 3, between the piston rod and the piston. The piston, which, as aforementioned, is generally designated by the reference numeral 17, has a snap-on packing cap of rubber or other resilient material designated by the reference numeral 180. The piston 17 has an inwardly extending centrally located annular cup portion designated by the reference numeral 181. The cup portion 181 has a cut-away portion 182 of somewhat larger inside diameter therein for receiving one end of a metallic sleeve 183, the sleeve 183 having a portion of increased thickness for providing an annular shoulder 184.

Disposed within the cup portion 181 and the adjacent end of the sleeve 183 are two portions of a receptacle designated by the reference numerals 185 and 186, the portions 185 and 186 being formed to snugly receive the ball portion 187 which is formed integrally with, and connected by neck 188 to, the aforementioned portion 176 of the piston rod. Neck 188 passes through the bore 189 in element 185. The cup portion 181 has a pair of threaded bores 190 and 191 therein on opposite sides thereof, Fig. 2, in alignment with bores 192 and 193 respectively in the sleeve 183 for receiving a pair of locking screws or pins designated by the reference numerals 194 and 195 respectively. The aforementioned bores 190 and 191 open into a shallow groove 196 in the outside wall of cup portion 181, this groove 196 having mounted therein an annular spring strap member or clamp designated by the reference numeral 197.

The other end of the aforementioned cylindrical sleeve 183 passes through a bushing 198 mounted in a bore 199 in the wall of the rear portion 200 of the brake cylinder.

Portion 200 is secured to the front wall portion 55 of the brake cylinder by a plurality of bolts at spaced intervals around the periphery of the cylinder, two of the bolts being shown at 201 and 202, Fig. 2, the bolts 201 and 202 having nuts 203 and 204 associated therewith respectively. An additional bolt is shown at 205, Fig. 6, having nut 206, Figs. 1 and 3. A fourth bolt, not shown, is located above bolt 202, Fig. 2. The bolts 201, 202, and 205 may extend the length of the cylinder, passing through bores in flanges in the cylinder head portion generally designated 207, such as flanges 208 and 209, Fig. 6. A gasket 210, Figs. 2 and 3, is disposed between the rear portion 200 and the head portion 207 of the cylinder. The rear portion 200 of the cylinder has a bore 211 therein, Fig. 3, for containing a filter air vent device 212, a vent being desirable to prevent air back of the piston from opposing movement thereof. An aforementioned biasing spring 26 is provided to exert a compression force between the back shoulder 213 of the inner side of back portion 200 of the cylinder and the shoulder portion 214 of the piston, for at all times tending to keep the piston adjacent the cylinder head 207, except when air under pressure is present in the cylinder for applying braking forces, in a manner to be hereinafter more clearly apparent.

As aforementioned, the sleeve 183 slides in the bushing 198 mounted in the bore 199 of the back portion 200 of to brake cylinder. Accordingly, there is provided an additional accordion-type mud guard 215 for preventing mud, moisture, dust or other extraneous matter from accumulating on the outer surface of the sleeve 183 and interfering with the free sliding movement thereof. One end of the accordion type mud guard 215 is attached to the rear of portion 200 of the brake cylinder by a metallic ring 216 having disposed in spaced bores therein a plurality of screws, two of the screws being shown at 217 and 218, Fig. 2, screws 217 and 218 having the threaded ends thereof in threaded engagement in threaded bores 219 and 220 respectively in the rear portion 200 of the cylinder. An additional pair of screws are shown at 221 and 222, Fig. 3, in threaded engagement in threaded bores 223 and 224 respectively. The other end of the accordion-type mud guard 215 is attached to trunnion member 14 by a metallic ring 225, Figs. 2 and 3, and a plurality of screws disposed in bores at spaced intervals around the ring 225, two of the screws being shown at 226 and 227, Fig. 2, and having their threaded ends in threaded engagement with threaded bores 228 and 229 respectively in the trunnion member 14. An additional pair of screws are shown at 230 and 231, Fig. 3, in threaded engagement in threaded bores 232 and 233 respectively.

Particular reference should be made now to Fig. 3 wherein there is shown means for admitting compressed air or other fluid under pressure to the brake cylinder for causing the cylinder to slidably move with respect to the piston and move the brake shoe carried therewith into braking engagement with the wheel 10 of the vehicle. Air admitted by hose from the source of supply, not shown, through a bore 234, and through aperture 235, forces the head 207 of the cylinder forward or to the right, Fig. 3, carrying with it the brake shoe 22, when a predetermined minimum pressure necessary to overcome the force of biasing spring 26 is attained. Similar means for connecting the brake cylinder to the source of supply is provided in the other side of the brake cylinder so that the brake unit can be used on either side of the car, cross-bore 236 being provided between the two inlets. The unused inlet, such as inlet 234, for example, will be closed as by such as the plug 237 shown in Fig. 3.

The brake cylinder has formed integrally therewith an aforementioned pressure head portion 207, having therein a shoe lug pocket 238 and a pair of aforementioned facing plate portions 20 and 21, and also has a pair of keyways 239 and 240 in the top and bottom of the shoe lug pocket, Fig. 3. The aforementioned brake shoe 22 has a metallic backing plate portion 241 which has secured thereto or formed integrally therewith a shoe lug 242 which has apertures 243 and 244 therein adapted, while the brake shoe 22 is mounted on the pressure head of the brake cylinder, to be in alignment with the aforementioned keyways 239 and 240 in the pressure head portion generally designated 207. The aforementioned key 23, passing through keyways 239 and 240 in the shoe lug pocket, and through apertures 243 and 244 in the shoe lug 242, securely holds the brake shoe 22 in position on the head of the brake cylinder. For reasons which will be apparent to those skilled in the art to which the invention pertains, the brake shoe 22 has a central portion 245 of somewhat smaller width than the average width of the shoe for providing a ventilating passage to reduce the heating effect of frictional contact between the shoe and wheel. As previously explained, the brake shoe 22 is adapted, while a predetermined air pressure exists in the brake cylinder, to be maintained in a position whereat the brake shoe maintains braking engagement with the tread of the wheel 10.

In the operation of the aforedescribed apparatus, assume by way of example that the braking apparatus is in a "brake released" condition. In that event the apparatus assumes the position shown in Figs. 2 and 3. Compression of the helical spring 26 pressing against the back 200 of the brake cylinder forces the back of the cylinder to the left, Fig. 1, forces the piston and cup 180 into abutting relation with the cylinder head 207, and further causes the brake shoe 22 to assume a position whereat it is not making braking engagement with the wheel 10. Assume now by way of description that air is supplied under a predetermined minimum pressure to the brake apparatus for the application of brakes. The air forces the brake cylinder 18 to the right, Fig. 3, moving the cylinder head 207 away from the piston 17, and the brake cylinder 18 slides upon the arms 37 and 13 carrying the brake shoe 22 with it until the brake shoe 22 makes engagement with the wheel 10.

As aforementioned, it is one of the objects of this invention to provide a suitable hand brake or parking brake for the end axle or axles of the car unit or vehicle. The this end the aforementioned pulleys 44 and 27 are provided, and the aforementioned grooves 91 and 30 are provided in the aforementioned terminal connector members 92 and 29 respectively, Fig. 2. As previously mentioned, a cable, not shown, is wrapped around the member 92 in the groove 91 thereof, Fig. 2, corresponding to cable 28, Fig. 1. The cables on either side pass around the pulleys 44 and 27 respectively in the grooves 45 and 46 thereof respectively; and, as previously stated, the other ends of the cables are attached to a lever, not shown, which may be manually operated. Movement of the manually operated lever device, not shown, pulls the members 66 and 19 and the brake cylinder to the right against the compression of spring 26, carrying the brake shoe 22 into braking engagement with the wheel 10; when it is desired to release the brakes, the hand-operated member is returned to its former position and the aforementioned spring 26 forces the brake cylinder backward, or to the left, Fig. 2, carrying with it brake shoe 22.

In summary, it will be seen that apparatus has been provided admirably suited to carry out aforenamed objectives of the invention. Side frame elements in the form of L-shaped bars are provided with bores in the arm portions thereof to receive an end piece or trunnion member which is pivotally mounted near the ends of the arms. This trunnion member is provided with a center bore to receive one end of a piston rod which is adjustable within the trunnion member and which is provided with a lock nut. This piston rod arrangement and lock nut serves as a slack adjuster for the brake cylinder. The brake cylinder is slidably carried by guide sleeves on the arms, and is arranged to slide on these arms with the brake application and release, with the piston member remaining substantially stationary. The brake cylinder is provided with a shoe receiving portion carrying a brake shoe which transmits the brake force to the tread of the wheel. The ball and socket arrangement connecting the piston rod to the piston permits the brake shoe to align itself to the surface of the wheel irrespective of the amount of vertical flex in the rubber members which protect the cylinder assemblage from vibrational shock resulting from the roadway, and contact between the brake shoe and wheel. Rubber accordion-type boots or guards are provided to prevent dirt, ice and other foreign matter accumulating on the arms to bind the cylinder against travel. A similarly arranged boot is provided between the non-pressure head of the brake cylinder and the trunnion member to prevent ice and other foreign matter entering the brake cylinder at the piston rod. The brake cylinder supply inlet is provided as shown and extends to either side of the brake arrangement to receive a hose connecting between the car body and the brake unit; this enables the brake unit to be used on either side of the car.

If desired, a pair of brake units, each similar to the apparatus hereinbefore described, may be mounted on the two sides of a wheel to provide increased braking force. The invention also is directed to the use of brake cylinders of different diameters or capacities at the several wheels of a train, where it is desired to apply more braking force to certain wheels than to others.

Having now described the invention, what I claim as new and desire to secure by Letters Patent, is:

1. Tread brake apparatus for use with a brake shoe on a railway vehicle having a supply of fluid under pressure comprising, in combination, a pair of side frame elements, each of said side frame elements having an extended arm portion and an attaching portion for fastening to the vehicle, said side frame elements while attached to the vehicle being in positions whereat the arm portions are disposed in predetermined fixed spaced-apart positions with respect to each other and to a vehicle wheel to be braked, a trunnion member pivotally mounted between said arm portions, a piston rod attached at one end thereof to said trunnion member, a piston connected to the other end of said piston rod, a brake cylinder in which said piston operates, said brake cylinder having disposed therein spring means biasing said piston toward one end of the cylinder, said brake cylinder having means for admitting fluid under pressure to the cylinder for forcing said piston away from said last named end, means slidably mounting said brake cylinder on said arm portions, and a brake shoe carried by said brake cylinder, said cylinder being moved by a predetermined pressure of fluid admitted to the cylinder to shift said brake shoe into braking engagement with the tread of said wheel.

2. Tread brake apparatus for a railway vehicle having a drop center axle including a cradle, and a supply of fluid under pressure, comprising, in combination, a pair of side frame elements having arm portions and adapted to be attached to said cradle in predetermined spaced positions with respect to each other and to a wheel to be braked, a trunnion member pivotally mounted on said arm portions, said trunnion member having a threaded bore disposed substantially centrally thereof, piston rod means, said piston rod means including a threaded portion on one end thereof in threaded engagement in said threaded bore and a ball type connecting portion on the other end thereof, locking nut means on said threaded portion for maintaining said threaded portion in predetermined position in said threaded bore, a piston having socket means operatively associated with the ball connecting portion of the piston rod means, movable brake cylinder means in which said piston operates and slidably mounted on said arm portions, spring biasing means for said piston, said brake cylinder means including means for admitting fluid under pressure from the supply to the brake cylinder means at a predetermined point therein, and brake shoe means including a brake shoe carried by the brake cylinder means and moved to a position whereat the brake shoe makes braking engagement with said wheel when fluid under at least a predetermined pressure is admitted to the brake cylinder means.

3. Tread brake apparatus for a railway vehicle having a supply of fluid under pressure, comprising, in combination, a pair of side frame elements having arm portions and adapted to be attached to the body of the vehicle in predetermined spaced positions with respect to each other and to a wheel to be braked, a trunnion member pivotally mounted on the arm portions, a piston rod attached to said trunnion member at one end thereof and having a piston operatively connected to the other end thereof, a brake cylinder in which said piston operates, biasing means for said piston, said brake cylinder having a pair of grooves in the outside of the wall thereof, means slidably mounting said brake cylinder on said arm portions, said last named means including a pair of metallic sleeves disposed around said arm portions respectively and slidable thereon, a pair of resilient sleeves disposed around said metallic sleeves respectively and secured thereto, said pair of resilient sleeves being disposed in said pair of grooves respectively, means maintaining said resilient sleeves in place in said grooves, said brake cylinder including means for admitting fluid under pressure into the brake cylinder, and brake shoe means including a brake shoe and operatively connected to the brake cylinder, said brake shoe making braking engagement with said wheel while fluid under at least a predetermined pressure is maintained in said brake cylinder.

4. Tread brake apparatus according to claim 3 including in addition a pair of mud guard means for each of said metallic sleeves, each pair of mud guard means being attached to a metallic sleeve on the ends thereof and to the adjacent arm portion and adapted to protect said last named arm portion from dust, moisture, ice and other extraneous matter and to permit free movement of the metallic sleeve.

5. Tread brake apparatus for a railway vehicle having an axle and a supply of fluid under pressure, comprising, in combination, a pair of side frame elements having extended arm portions and adapted to be connected to the axle of the vehicle in predetermined spaced positions with respect to each other and to a wheel to be braked, a trunnion member pivotally mounted on said arm portions, said trunnion member having a threaded bore substantially centrally disposed thereof, piston rod means having at one end thereof a threaded portion in threaded engagement in said threaded bore and having locking nut means for maintaining a preselected position therein, a piston operatively connected to the other end of said piston rod means, brake cylinder means including a brake cylinder in which said piston operates, spring means biasing said piston, means slidably mounting said brake cylinder means on said arm portions, said mounting means including a pair of metallic sleeves slidably mounted on said arm portions respectively, a pair of additional sleeves of resilient material disposed around said pair of metallic sleeves respectively and secured thereto, said resilient sleeves being secured to said brake cylinder means, pairs of mud guards for each of said metallic sleeves, said pairs of mud guards being attached to said metallic sleeves and to the adjacent arm portions and protecting said arm portions from the accumulation of mud and other extraneous matter while permitting free movement of the metallic sleeves, said brake cylinder means including means for admitting fluid under pressure into the brake cylinder between the cylinder head and said piston, and brake shoe means including a brake shoe carried by the brake cylinder means and moved against the tension of said spring biasing means when fluid under at least a predetermined pressure is admitted to said brake cylinder to a position whereat the brake shoe makes braking engagement with said wheel, said spring biasing means returning said brake cylinder means and brake shoe to a brake released position when fluid under pressure is exhausted from said brake cylinder.

6. Tread brake apparatus according to claim 5 including in addition mud guard means disposed around said piston rod means between said brake cylinder means and said trunnion member for preventing the accumulation of mud and other extraneous matter on said piston rod means.

7. Tread brake apparatus according to claim 5 wherein said piston rod means and said piston are additionally characterized as being operatively connected to each other by a universal coupling.

8. Tread brake apparatus according to claim 5 wherein said brake shoe means is additionally characterized as having a shoe lug pocket, and said brake shoe is additionally characterized as being detachable and including a shoe lug, said brake shoe means including in addition a key for maintaining said shoe lug in said lug pocket.

9. Tread brake apparatus for association with the wheel of a railway car, said apparatus comprising a cylinder having a pressure head, a non-pressure head and a body portion, a piston operable in said body portion and having a piston rod which extends slidably through the non-pressure head of the cylinder, supporting means fixed relative to the position of the wheel for supporting said cylinder for slidable movement radially toward and away from the wheel of the vehicle, means for attaching the external end of the piston rod to said supporting means, a brake shoe carried on the pressure head of the cylinder and moved into braking engagement with the tread of the wheel upon admission of fluid under pressure between the piston and the pressure head, a pair of pulleys mounted on said supporting means, said body portion having on the sides thereof a pair of means for attaching cables thereto, and cables passing around said pulleys respectively for moving said body portion and thereby moving said brake shoe into braking engagement with the tread of said wheel without the introduction of fluid under pressure into said brake cylinder.

References Cited in the file of this patent

UNITED STATES PATENTS

| | | |
|---|---|---|
| 406,844 | Lansberg | July 9, 1889 |
| 1,040,846 | Barber | Oct. 8, 1912 |
| 1,148,026 | Kroegher | July 27, 1915 |
| 1,612,781 | Sauvage | Dec. 28, 1926 |
| 1,916,470 | Fageve et al. | July 4, 1933 |
| 2,543,326 | McGowan | Feb. 27, 1951 |

FOREIGN PATENTS

| | | |
|---|---|---|
| 9,154 | Great Britain | Apr. 22, 1903 |